US008103271B2

(12) United States Patent
Calderhead, Jr. et al.

(10) Patent No.: US 8,103,271 B2
(45) Date of Patent: Jan. 24, 2012

(54) AIRCRAFT DATA RADIO WITH ALTERNATIVE CHANNEL SELECTION

(75) Inventors: William Fraser Calderhead, Jr., Redmond, WA (US); Lynn Marie Root, Kent, WA (US)

(73) Assignee: Universal Avionics Systems Corporation, Tucson, AZ (US)

( * ) Notice: Subject to any disclaimer, the term of this patent is extended or adjusted under 35 U.S.C. 154(b) by 316 days.

(21) Appl. No.: 12/510,615

(22) Filed: Jul. 28, 2009

(65) Prior Publication Data

US 2011/0028147 A1    Feb. 3, 2011

(51) Int. Cl.
*H04W 4/00* (2009.01)
(52) U.S. Cl. ............... 455/431; 455/436; 455/456.1; 455/525
(58) Field of Classification Search .......... 455/431, 455/456.1, 525, 441, 436
See application file for complete search history.

(56) References Cited

U.S. PATENT DOCUMENTS

| 5,883,586 A | 3/1999 | Tran et al. |
| 6,353,779 B1* | 3/2002 | Simon et al. ............ 701/3 |
| 6,567,395 B1 | 5/2003 | Miller |
| 7,142,854 B1 | 11/2006 | Kauffman et al. |
| 2003/0139181 A1* | 7/2003 | Roy et al. ............ 455/427 |
| 2010/0234024 A1* | 9/2010 | McGuffin ............ 455/436 |

* cited by examiner

*Primary Examiner* — Barry Taylor
(74) *Attorney, Agent, or Firm* — Quarles & Brady LLP; George E. Haas

(57) ABSTRACT

A data link radio system onboard an aircraft communicates with a plurality of ground stations that employ either an analog communication protocol or a digital communication protocol. A database contains information related to each ground station and its respective communication protocol. A transceiver communicates data bidirectionally with the ground stations. A receiver scans for an alternative ground station to use as an alternative to an active ground station with which the transceiver is communicating. When the active ground station becomes unavailable, the transceiver is automatically reconfigured for the analog or digital communication protocol used by the alternative ground station and then begins communicating with the alternative ground station.

15 Claims, 3 Drawing Sheets

AIRCRAFT DATA RADIO WITH ALTERNATIVE CHANNEL SELECTION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to aircraft communication radios; and more particularly to data link radios for communicating data with different ground stations.

2. Description of the Related Art

Aircraft commonly have a very high frequency (VHF) radio that provides a bidirectional data link to support air traffic control and airline operational control. This "data link" radio can be used to transmit and receive tactical data, and navigational messages between the aircraft and ground stations. The data link radio is part of the Aircraft Communications Addressing and Reporting System (ACARS) that comprises networks of ground stations covering most of the developed areas of the world that provide communications for airline operational control, air traffic services, and air traffic control.

In the original implementation of ACARS, ground stations operated by different service providers and in different geographical regions were assigned different frequencies (VHF channels). Those ACARS radios employ a communication protocol referred to as Mode A in which the data is transmitted at 2400 bits per second using minimum shift keying (MSK) modulation that produces a signal which modulates the VHF carrier. The result is a radio frequency signal that is double side-band amplitude modulated at 2400 bits per second (DSB AM-MSK).

As the use of data link radios grew, the ground stations geographical areas with large amounts of aircraft traffic began operating at or near full capacity and it was not practical to provide more radio frequencies for data link use. In order to accommodate an expanding need for greater communication capabilities, ACARS was enhanced with another data link protocol, referred to as Mode 2. Initially all Mode 2 ground stations operated on the same radio frequency, however, recently some Mode 2 ground stations have been assigned to secondary frequencies. This protocol employs a digital modulation scheme and a significantly higher data rate of 31,500 bits per second, thereby making more efficient use of the VHF channel than the Mode A protocol. The increase in data transfer capacity is made possible by utilizing the differential eight phase shift keying (D8PSK) modulation technique. This allows the same number of VHF ground stations that previously operated with the Mode A protocol to serve a greater number of aircraft by switching to the Mode 2 protocol. Because of that very high data transfer rate, many the Mode 2 stations are able to share the same frequency by utilizing signal collision avoidance algorithms.

Regardless of the protocol, in order to establish communication with a particular ground station, the radio receiver onboard an aircraft first listens for a station information message on the VHF channel. The station information message, sometimes called a "squitter", is transmitted periodically, e.g. once every two minutes, to inform aircraft radios that the particular ground station is active and generally available for communication. Upon receiving a station information message, the aircraft data link radio system establishes data communication.

As an aircraft travels, it moves beyond the range of one ground station and needs to establish communication with a new ground station closer to the aircraft's present position. If the a station is operating in a different mode, heretofore that required that the aircraft data link radio system to wait up to two minutes for a station information message or a permission to send message from a new station before communication could commence. Furthermore, the radio system may have to be configured manually for that different communication mode. Also even though some areas of heavy air traffic, such as the Northeast region of the United States of America, are serviced by both Mode 2 and Mode A stations, an aircraft approaching that area using the Mode A protocol may have to switch to Mode 2 protocol because the Mode A stations ahead are operating at maximum capacity. In each of these situations, the data radio onboard the aircraft had to wait until a station information message or a permission to send message was received from a new station.

It is desirable to automate the transfer of aircraft communication from one ground station to another with as minimal delay time and with minimal manual intervention by the flight crew.

SUMMARY OF THE INVENTION

A data link radio system onboard an aircraft communicates with a plurality of ground stations in the Aircraft Communications Addressing and Reporting System. Each ground station employs either the Mode A protocol for analog communication or the Mode 2 protocol for digital communication.

The aircraft's data link radio system includes a transceiver for communicating data bidirectionally with the plurality of ground stations. A secondary receiver is provided to receive signals from the plurality of ground stations and determine whether a particular station is available to use should another ground station with which the transceiver is communicating becomes unavailable. In one embodiment of the data link radio system, a processor controls operation of the transceiver and the secondary receiver.

With this system, when the transceiver is communicating with a primary ground station that employs either the Mode A protocol or the Mode 2 protocol, the secondary receiver may determine availability of an alternative ground station that employs the other one of the Mode A protocol and the Mode 2 protocol. Now when the primary ground station becomes unavailable, the transceiver is configured automatically for the second one of the Mode A protocol and the Mode 2 protocol and switches communication to the alternative ground station.

DETAILED DESCRIPTION OF THE INVENTION

Figure 1:
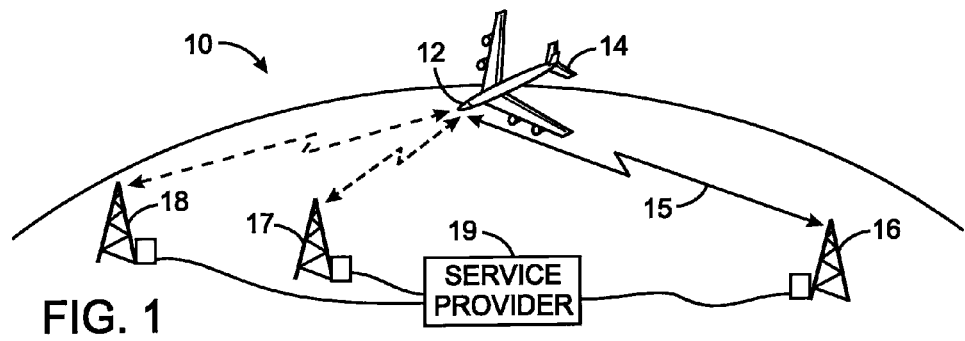
FIG. 1 is a depiction data link communication system in which an aircraft communicates with a plurality of ground stations.

With reference to FIG. 1, a communication system 10, such as the Aircraft Communications Addressing and Reporting System, includes a data link radio system 12 onboard an aircraft 14 and a plurality of ground stations 16, 17 and 18. The ground stations 16-18 are connected in a network to a data link service provider 19. The aircraft's data link radio system 12 communicates with a primary ground station 16, preferably by a very high frequency (VHF) communication link 15, although the principles of the present invention can be implemented with other protocols and other types of communication links. Information, such as data, tactical, and navigational data, is exchanged between the data link radio system 12 and the ground station 16. The aircraft 14 communicates with different ones of those ground stations 16-18 as it traverses different geographical areas.

As will be described hereinafter in greater detail, as communication with the primary ground station 16 becomes unavailable for any of a variety of reasons, such as the aircraft traveling out of range of the radio signal from that ground station, the data link radio system 12 on board the aircraft 14 automatically switches to an alternative communication link with another ground station 17 or 18.

In the exemplary communication system 10, each of the ground stations 16, 17, or 18 utilizes either the standard Mode 2 or Mode A protocol. Both Mode A and Mode 2 are carrier sense multiple access protocols in which an aircraft having data to transmit listens on the associated frequency to determine whether communications with other aircrafts are occurring. If the frequency is available, the aircraft will then transmit its data message, otherwise the aircraft waits for a random period of time before listening to the frequency again. Because every aircraft seeking to use a particular frequency waits random intervals, eventually each one will find a point in time when the frequency is available for carrying a message.

In the United States, service providers have ground stations operating with the Mode A protocol which cover the entire country. It is has been only recently that Mode 2 stations have been commissioned by the service providers, typically in the geographical areas with the very dense aircraft traffic. Therefore, an aircraft departing a major metropolitan area that has been communicating with the Mode 2 digital protocol may eventually travel to an area that is serviced only by Mode A stations. At that point in time as the Mode 2 station becomes unavailable, the onboard data link radio must switch over for Mode A operation. This requires tuning the radio for a particular Mode A station and reconfiguring the radio for analog communication. Conversely, when an aircraft communicating in analog Mode A approaches a geographical area of more dense aircraft traffic, although that approaching area is still serviced by a Mode A station, the available Mode A stations may be fully occupied with communications from other aircraft. Thus the aircraft must switch from Mode A to Mode 2 communication and acquire a Mode 2 station within the geographical area that the aircraft is entering. Here too, the data link radio must be reconfigured from one mode to another and be tuned to a different frequency.

Typically, when the aircraft is transferring from one geographical area serviced by a Mode 2 station to another geographical area serviced by another Mode 2 station, a handoff occurs in a similar manner as with cellular telephone conversations and different cell towers. That is, the frequency and the transmission protocol remain the same and the data link radio system onboard the aircraft either detects other viable stations or receives instructions from the old ground station regarding the identification of the new station to which to establish communication. The data link radio system does not have to be reconfigured other than storing the identifier for the new ground station.

Figure 2:
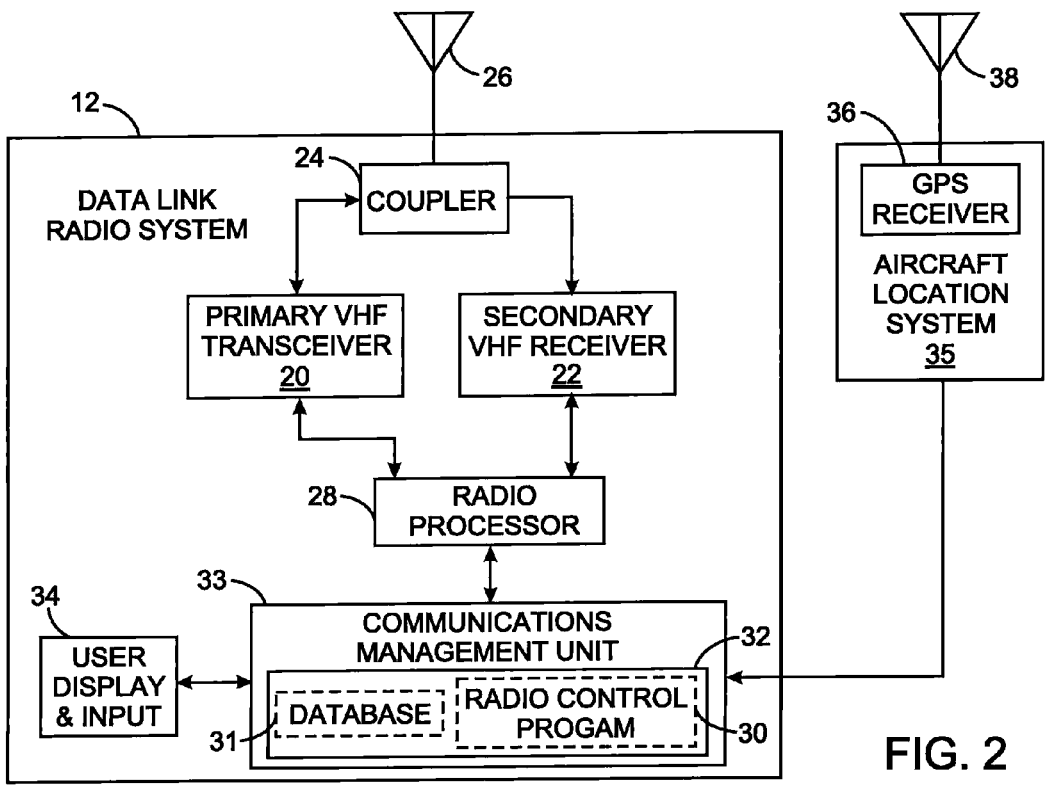
FIG. 2 is a schematic diagram of an aircraft onboard radio system which incorporates the present invention.

With reference to FIG. 2, the data link radio system 12 onboard the aircraft comprises a primary VHF transceiver 20, for carrying out bidirectional communications with the ground stations 16-18, and a secondary VHF receiver 22, for receiving signals from the ground stations. Both the primary VHF transceiver 20 and secondary VHF receiver 22 are connected to an antenna 26 via a signal coupler 24 and are controlled by a radio processor 28. The radio processor 28 is a microcomputer based device that is responsible for tuning the primary VHF transceiver 20 and secondary VHF receiver and for signal modulation and demodulation.

The radio processor 28 is coupled to a communications management unit (CMU) 33, which controls the overall operation of the data link radio system 12. The CMU 33 interfaces to other equipment in the aircraft, generates downlink messages and receives uplink messages from ground stations. A user display and input device 34 enables the flight crew to control and monitor operation of the data link radio system.

In order to automatically tune different ground stations and configure the data link radio system 12 for communication with a particular station, the CMU 33 includes a radio control program 30 that utilizes a database 31 stored within the CMU memory 32. As will be described in greater detail, the database 31 contains information about each of the Mode A ground stations with which the aircraft 14 can communicate and for each station specifies information such as the geographical location and radio frequency.

The communications management unit 33 also receives information regarding the geographical location of the aircraft from an aircraft location system 35 elsewhere onboard the aircraft 14. The aircraft location system 35 preferably utilizes a global positioning system (GPS) receiver 36 which receives signals from earth orbiting satellites and from those signals determines the longitude and latitude of the aircraft. The GPS receiver 36 is connected to a separate antenna 38. Although a GPS receiver is preferred, other well known equipment and processes for determining the location of an aircraft may be utilized in the aircraft location system 35.

Figure 3A:
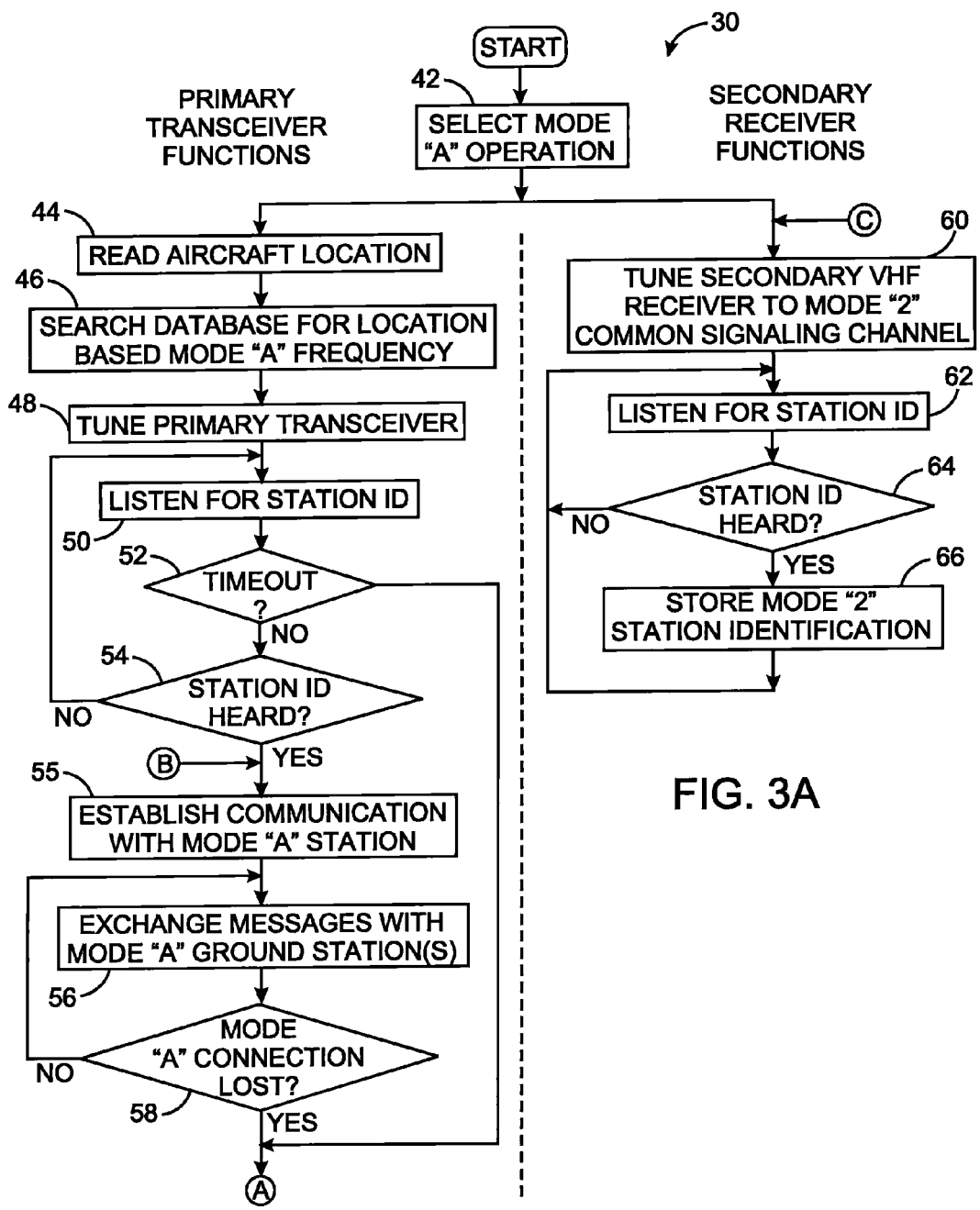
FIGS. 3A and 3B form a flowchart of a process by which equipment onboard an aircraft identifies alternative data link radio ground stations to use in the future.

With reference to FIG. 3A, the radio control program 30 executed by the communications management unit 33 commences at step 42 in which the CMU selects Mode A protocol operation and notifies the radio processor 28 of that selection. The radio processor 28 responds by configuring the primary VHF transceiver 20 and the secondary VHF receiver 22 accordingly.

At step 44, the data link radio system 12 begins operating in the Mode A protocol. Specifically, the CMU 33 reads the location of the aircraft 14 from the aircraft location system 35 and then uses that information at step 46 to search the database 31 for the radio frequency used by Mode A ground stations in the present geographical region. At step 48, the radio frequency is sent to the radio processor 28 which tunes the primary VHF transceiver 20 to that frequency and configures that transceiver for Mode A protocol transmissions.

The primary VHF transceiver 20 begins listening at step 50 for a station information message. There is a possibility that no ground station in this is geographical region is presently operating, for example a ground station may be shut down for maintenance or the aircraft is over a large body of water that is not served by a ground station. In that case, the listening for a ground station will time-out a step 52 and jumps after step 58, otherwise the primary VHF transceiver 20 continues to listen for a Mode A ground station.

When a Mode A ground station is heard at step 54, the radio control program 30 advances to step 55 at which communication between the primary VHF transceiver 20 and the respective Mode A ground station is established by standard techniques. The particular ground station with which the primary VHF transceiver 20 is communicating is referred to herein as the "primary ground station." Thereafter at step 56, data link messages are exchanged between the aircraft and the primary ground station. If the aircraft travels to the boundary of the signal coverage area of the primary ground station, as indicated by a low signal strength, the communication is handed off to another station having a greater signal strength at the present aircraft location, which hand off follows the conventional Mode A protocol. If, however, all Mode A protocol communication is found to be lost at step 58, the program execution advances to a section in which the primary VHF transceiver 20 is reconfigured for Mode 2 protocol operation.

In order to prepare the data link radio system 12 for possible operation in Mode 2, the secondary VHF receiver 22 begins searching for such an available Mode 2 station at the commencement of Mode A protocol operation in FIG. 3A. Thus when that latter protocol mode is selected at step 42, the radio processor 28 tunes the secondary VHF receiver 22 to the common signaling channel for Mode 2 stations and configures that receiver for that protocol mode at step 60. Then at step 62, the secondary VHF receiver 22 begins listening continuously for a station information message. When a station information message is heard, step 64 causes the program execution to branch to step 66 at which the identification of that ground station is sent through the radio processor 28 to the CMU 33 where that data is stored in memory. This ground station is referred to herein as an "alternative ground station." The secondary VHF receiver 22 continues listening for Mode 2 ground stations as the aircraft 14 travels through different geographical regions and changes the designation of the alternative ground station as the aircraft comes in to range of another Mode 2 ground station.

Figure 3B:
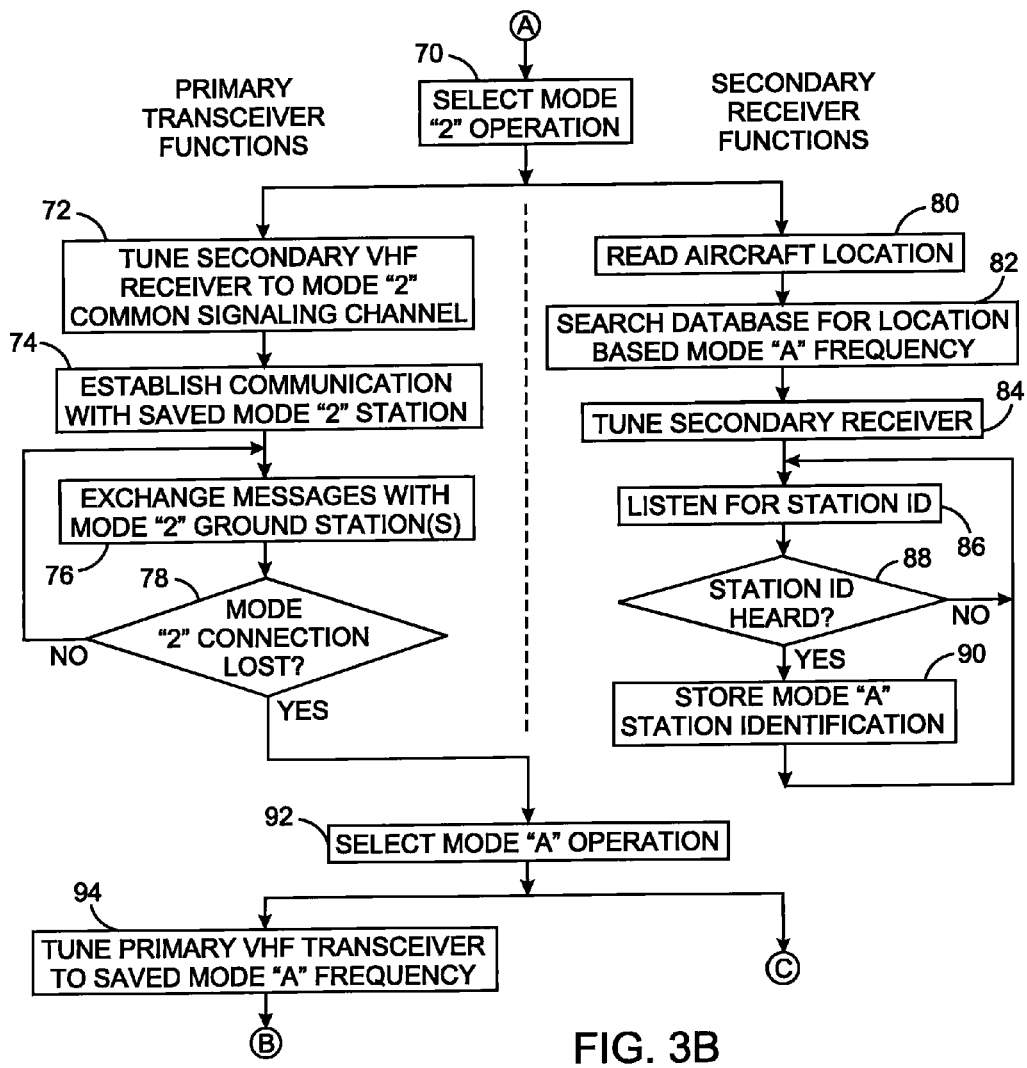

Therefore, when the aircraft is found to have lost communication with all the Mode A ground stations at step 58, the memory of the CMU 33 contains the identity of an alternative Mode 2 ground station to use for data link communication. If that communication loss occurs, execution of the radio control program 30 advances to step 70 on FIG. 3B. At this point, the CMU 33 selects Mode 2 protocol operation notifies the radio processor 28 of that selection. The radio processor 28 responds by configuring the primary VHF transceiver 20 and the secondary VHF receiver 22 accordingly.

At step 72, the radio processor 28 tunes the primary VHF transceiver 20 to the common signaling channel for Mode 2 ground stations and configures that transceiver for that mode. The radio processor also obtains the identification of Mode 2 ground station that was stored in the CMU memory at step 66 by the secondary VHF receiver 22. That identification is used by the primary VHF transceiver 20 to establish communication with that ground station at step 74, which thereby becomes the new primary ground station. Thereafter at step 76, data link messages are exchanged between the aircraft 14 and this primary ground station. If the aircraft travels to the boundary of the signal coverage area of the primary ground station, as indicated by a low signal strength, the communication is handed off to another station having a greater signal strength at the present aircraft location, which hand off follows the conventional Mode 2 protocol.

While the primary VHF transceiver 20 is operating in the Mode 2 protocol, the secondary VHF receiver 22 searches for a nearby Mode A ground station. This is accomplished starting at step 80 by the CMU 33 reading the location of the aircraft from the aircraft location system 35 and then using that information at step 82 to search the database 31 for the radio frequency used by Mode A ground stations in that geographical region. At step 84, the resultant radio frequency is sent to the radio processor 28, which causes the secondary VHF receiver 22 to be tuned to that frequency and configured for Mode A protocol operation.

Next at step 86, the secondary VHF receiver 22 begins listening for a station information message. When a Mode A ground station is heard at step 88, the radio control program 30 advances to step 90 at which the identification of that station is sent through the radio processor 28 to the CMU 33 where that data is stored in memory. This ground station now becomes the alternative ground station. The secondary VHF receiver 22 continues listening for Mode A ground stations as the aircraft travels through different geographical regions and changes the designation of the alternative ground station as the aircraft comes in to range of another Mode A ground station.

If all Mode 2 communication is found to be lost at step 78, the memory of the CMU 33 contains the identity of a Mode A ground station to use for data link communication. In the case of that communication loss, the radio control program 30 execution advances to step 92 on FIG. 3B to reconfigure primary VHF transceiver 20 for Mode A protocol operation. At that time, the CMU 33 instructs the radio processor 28 to tune the primary VHF transceiver 20 to the Mode A ground station identified by the data stored in the CMU memory. Then at step 94, the radio processor 28 tunes the primary VHF transceiver 20 to the frequency of that Mode A ground station before operation of the primary VHF transceiver jumps to step 55 on FIG. 3A. At the same time the CMU 33 instructs the secondary VHF receiver 22 to begin searching for an alternative Mode 2 ground station by an appropriate command sent at step 60.

As a consequence, when the primary VHF transceiver 20 is operating with either Mode A or Mode 2 protocol, the secondary VHF receiver 22 is obtaining information about an alternative ground station operating in the other mode to use in the event that the primary VHF transceiver loses communication.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A data link radio system onboard an aircraft for communicating with a plurality of ground stations in the Aircraft Communications Addressing and Reporting System, wherein each ground station employs one of a Mode A protocol for analog communication and a Mode 2 protocol for digital communication, the data link radio system comprising:
   a transceiver for communicating data bidirectionally with the plurality of ground stations, a particular one with which communication is occurring at a given time being referred to as a primary ground station;
   a secondary receiver for receiving signals from the plurality of ground stations; and
   a processor controlling operation of the transceiver and the secondary receiver;
   wherein when the primary ground station employs one of the Mode A protocol and the Mode 2 protocol, the secondary receiver determines availability of an alternative ground station that employs another one of the Mode A protocol and the Mode 2 protocol, and wherein when the primary ground station becomes unavailable, the transceiver automatically is configured for and begins communicating with the alternative ground station.

2. The data link radio system as recited in claim 1 further comprising a database containing information related to each of the ground stations that employs the Mode A protocol.

3. The data link radio system as recited in claim 2 wherein the information for each station in the database designates a radio frequency.

4. The data link radio system as recited in claim 2 wherein the information in the database further includes a geographical location of each ground station.

5. The data link radio system as recited in claim 4 wherein data link radio system receives information regarding a geographical location of the aircraft, and the secondary receiver selects one of the plurality of ground stations as the alternative ground station based on geographical proximity to the location of the aircraft.

6. A data link radio system onboard an aircraft for communicating with a plurality of ground stations in the Aircraft Communications Addressing and Reporting System, wherein each ground station employs one of a Mode A protocol for analog communication and a Mode 2 protocol for digital communication, the data link radio system comprising:
  a transceiver for communicating data bidirectionally with the plurality of ground stations, a particular one with which communication is occurring at a given point in time being referred to as a primary ground station; and
  a secondary receiver for receiving signals from the plurality of ground stations;
  wherein the secondary receiver selects one of the plurality of ground stations as an alternative ground station that is available for use by the transceiver, and wherein the primary ground station employs a first one of the Mode A protocol and the Mode 2 protocol and the alternative ground station employs a different second one of the Mode A protocol and the Mode 2 protocol, and
  wherein if the primary ground station becomes unavailable, the transceiver automatically is configured for the second one of the Mode A protocol and the Mode 2 protocol and switches communication to the alternative ground station.

7. The data link radio system as recited in claim 6 further comprising a database containing information related to each ground station that employs the Mode A protocol.

8. The data link radio system as recited in claim 7 wherein the information in the database for at least some of the plurality of ground stations includes a radio frequency.

9. The data link radio system as recited in claim 7 wherein the information in the database further includes a geographical location of each ground station.

10. The data link radio system as recited in claim 9 wherein data link radio system receives information regarding a geographical location of the aircraft, and the secondary receiver selects one of the plurality of ground stations as the alternative ground station based on geographical proximity to the location of the aircraft.

11. A method for operating data link radio system onboard an aircraft that has a transceiver and a secondary receiver for the Aircraft Communications Addressing and Reporting System which comprises a plurality of ground stations, wherein each ground station employs either a Mode A protocol for analog communication or a Mode 2 protocol for digital communication, that method comprising:
  the secondary receiver, scanning for one of the plurality of ground stations that is available and which is not in communication with the transceiver, thereby finding a alternative ground station;
  storing information regarding communication with the alternative ground station; and
  wherein when a ground station with which the transceiver has been communicating becomes unavailable, automatically configuring the transceiver for one of the Mode A protocol and the Mode 2 protocol employed by the alternative ground station and beginning communication with the alternative ground station.

12. The method as recited in claim 11 wherein the secondary receiver scans for an alternative ground station that employs a different one of the Mode 2 protocol and Mode A protocol than is being used by the transceiver.

13. The method as recited in claim 11 further comprising determining a location of the aircraft; and wherein the scanning selects one of the plurality of ground stations based on proximity to the location of the aircraft.

14. The method as recited in claim 11 further comprising providing a database containing a designation of a radio frequency for each of the ground stations that employs the Mode A protocol.

15. The method as recited in claim 11 further comprising providing a database containing a designation of a geographical location of each of the ground stations that employs the Mode A protocol.

* * * * *